United States Patent [19]
Kurusu et al.

[11] Patent Number: 5,657,180
[45] Date of Patent: Aug. 12, 1997

[54] MANAGEMENT INFORMATION UPDATING METHOD AND MASS STORAGE SYSTEM EMPLOYING THE METHOD

[75] Inventors: Ryutaro Kurusu; Tsutomu Narabu, both of Kawasaki, Japan

[73] Assignee: Fujitsu Limited, Kawasaki, Japan

[21] Appl. No.: 400,016

[22] Filed: Mar. 6, 1995

Related U.S. Application Data

[63] Continuation of Ser. No. 3,660, Jan. 13, 1993, abandoned.

[30] Foreign Application Priority Data

Jan. 16, 1992 [JP] Japan .................................. 4-005368

[51] Int. Cl.$^6$ .................................................. G06F 13/12
[52] U.S. Cl. ........................................ 360/92; 369/34
[58] Field of Search ............................ 360/92; 369/34; 414/273, 274

[56] References Cited

U.S. PATENT DOCUMENTS

| | | | |
|---|---|---|---|
| 5,036,503 | 7/1991 | Tomita | 360/92 |
| 5,132,949 | 7/1992 | Choi | 360/92 |
| 5,231,616 | 7/1993 | Oliver et al. | 369/34 |

FOREIGN PATENT DOCUMENTS

| | | |
|---|---|---|
| 62-236170 | 10/1987 | Japan . |
| 62-262262 | 11/1987 | Japan . |
| 2-199558 | 8/1990 | Japan . |
| 2-244819 | 9/1990 | Japan . |
| 3-14019 | 1/1991 | Japan . |
| 3-102511 | 4/1991 | Japan . |
| 3-162763 | 7/1991 | Japan . |

*Primary Examiner*—Robert S. Tupper
*Assistant Examiner*—David D. Davis
*Attorney, Agent, or Firm*—Staas & Halsey

[57] ABSTRACT

Management information necessary to manage storage media in a mass storage system. A rotatable cell drum has a plurality of cells arranged in a plurality of cell columns disposed in spaced circumferential relationship parallel to the axis of the drum and in a plurality of shelves disposed in spaced relationship transverse to the axis of the drum. A housing of the cell drum has an opening which confronts N cell columns of the cell drum, wherein 1≦N< the desired number of cell columns, thereby to enable manual storage of a storage medium in, or retrieval of a storage from, a corresponding cell in the N cell columns made accessible through the opening in the load/eject mode of operation of the mass storage system. The updating method includes (a) determining whether or not storage or retrieval of a storage medium has been made in the load/eject mode via the opening with respect to a cell in an arbitrary cell column which currently confronts the opening, (b) storing the management information related to the arbitrary cell column, which currently confronts the opening, in the load/eject mode if the storage or retrieval of the storage medium is detected in the step (a), (c) investigating the management information related to the storage medium in each of the cells in the arbitrary cell column, and (d) updating only that management information which is related to the arbitrary cell column and which is stored in the step (b) by the management information obtained in the step (c).

23 Claims, 8 Drawing Sheets

FIG. 5A
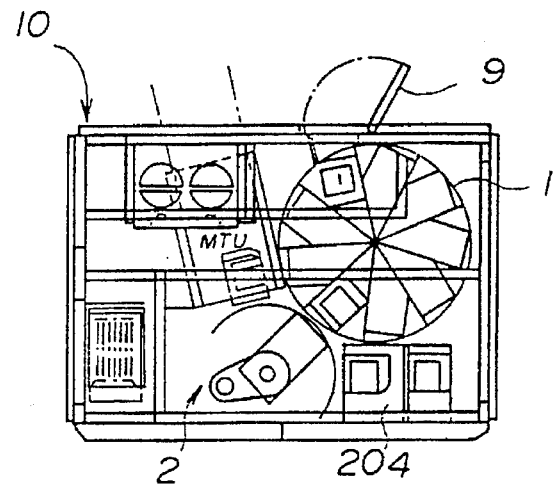
FIG. 5B
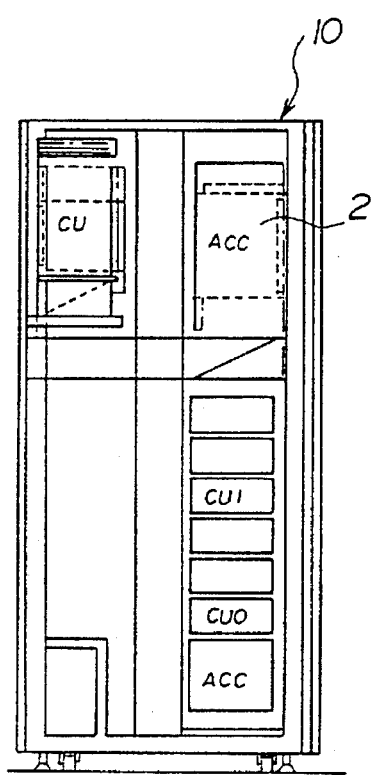
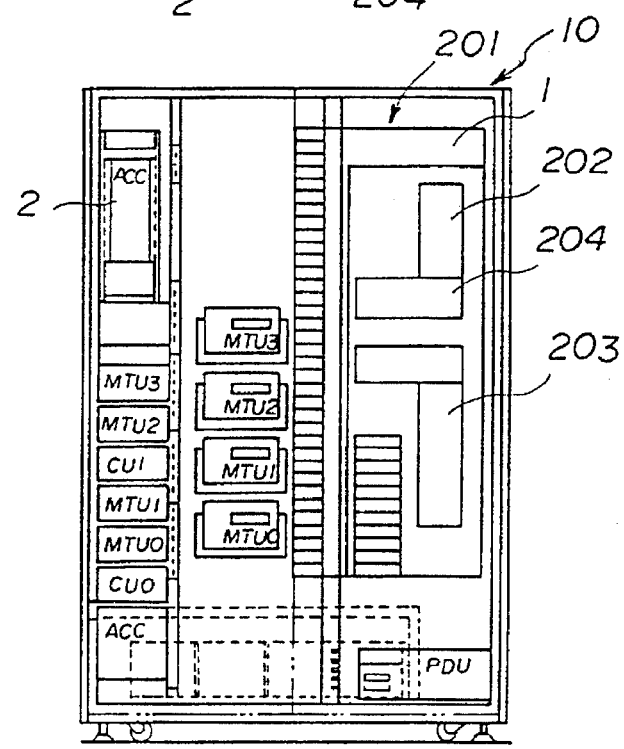
FIG. 5C

MANAGEMENT INFORMATION UPDATING METHOD AND MASS STORAGE SYSTEM EMPLOYING THE METHOD

This application is a continuation of application Ser. No. 08/003,660, filed Jan. 13, 1993, now abandoned.

BACKGROUND OF THE INVENTION

The present invention generally relates to management information updating methods and mass storage systems and, more particularly, to a management information updating method for updating management information which is managed by a host unit of a computer system when storing and retrieving a storage medium with respect to a mass storage system which is used as an external storage of the computer system, and to a mass storage system which employs such a management information updating method.

Recently, the amount of information processed in a computer system has increased considerably. For this reason, various automated mass storage systems have been proposed. The mass storage system stores storage mediums which contain the information, and the storage mediums are stored in and retrieved from the mass storage system without any need of operator intervention.

The storage medium takes the form of a magnetic tape cartridge, an optical disk cartridge or the like. The mass storage system has accommodating shelves which are provided with a plurality of cells for storing a plurality of storage mediums. An access mechanism of the mass storage system includes a mechanical hand which is used to store the storage medium into the cell and to retrieve the storage medium from the cell. The mechanical hand also transports the retrieved storage medium to a recording/reproducing unit which writes/reads data to/from the storage medium.

When the data write/read is completed, the mechanical hand retrieves the storage medium from the recording/reproducing unit and transports the storage medium to the cell to be stored therein. If the host unit instructs the mass storage system that a storage medium has become unnecessary, the mechanical hand transports the unnecessary storage medium to a load/eject mechanism so that the operator may retrieve the unnecessary storage medium which is ejected. On the other hand, if the operator loads a storage medium into the load/eject mechanism, the mechanical hand transports the loaded storage medium to the recording/reproducing unit or to the cell to be stored therein. Therefore, the mass storage system functions as a type of automated storehouse.

The host unit stores management information which is necessary to manage the storage mediums (i.e., media) including moving the storage mediums in the above described manner. For this reason, the management information is updated every time the operator stores or retrieves the storage medium.

While the management information is being updated, the host unit cannot access the mass storage system, and the processing efficiency of the computer system is deteriorated thereby. Hence, it is essential that the update time required to update the management information be short.

In FIG. 1A shows a plan view of a conventions mass storage unit 10 and FIG. 1 (B) shows a side view of the mass storage unit 10.

In FIGS. 1A and 1B, a cell drum 1 has a plurality of rotatable shelves 1a, 1b, 1c, which are arranged in a cylindrical shape. Each shelf of the cell drum 1 includes a plurality of cells 6 for storing storage mediums 5. For the sake of convenience, it will be assumed that the storage mediums 5 are magnetic tape cartridges. Each cell 6 stores one magnetic tape cartridge 5, and the cells 6 of the shelves are aligned at each level of the cell drum 1 in the horizontal direction in FIG. 1 (B) and aligned in each column of the shelves along the vertical direction in FIG. 1 (B).

An accessor 2 is arranged in correspondence with one column of the shelves of the cell drum 1. The accessor 2 detects whether or not a magnetic tape cartridge 5 exists within a cell 6, and also transports a magnetic tape cartridge 5 between corresponding cells 6 and the drive units 7 and 8 which perform data recording/reproduction with respect to the magnetic tape cartridge 5. The accessor 2 includes a mechanical hand 3 which transports the magnetic tape cartridge 5, fingers 4 which hold the magnetic tape cartridge 5, and a motor M1 which drives the mechanical hand 3 and the fingers 4.

A normally closed door 9 is provided in correspondence with one column of the shelves of the cell drum 1. The width of the door 9 is such that the operator can store and retrieve the magnetic tape cartridge 5 with respect to the cells 6 which are arranged in one column of the shelves of the cell drum 1.

The cell drum 1 is rotatable in directions A and B by a motor M2. The cell drum 1 is rotated in either the direction A or B and stopped at a position where the accessor 2 confronts the cell 6 which stores the specified magnetic tape cartridge 5 which is to be transported.

The mechanical hand 3 of the accessor 2 is moved in a direction C or D and positioned at the cell 6 which stores the specified magnetic tape cartridge 5. Then, the fingers 4 of the mechanical hand 3 are inserted into the cell 6 to hold and extract the specified magnetic tape cartridge 5 from, and transport some outside, the cell 6. The retrieved magnetic tape cartridge 5 is transported to the drive unit 7 or 8 and set therein.

When the data recording/reproduction in the drive unit 7 or 8 is completed, the fingers 4 of the mechanical arm 3 extract the magnetic tape cartridge 5 from the drive unit 7 or 8. In addition, the cell drum 1 is rotated so that the specified cell 6 in which the magnetic tape cartridge 5 is to be stored confronts the accessor 2. Thereafter, the mechanical hand 3 is positioned at the specified cell 6, so that the fingers 4 can store the transported magnetic tape cartridge 5 into the specified cell 6.

FIGS. 2A and 2B are is a diagram for explaining the storage and retrieval of a magnetic tape cartridge 5 with respect to a cell 6. FIG. 2A is a general plan view of the mass storage unit 10, and FIG. 2B is general side view of the mass storage unit 10.

The operator may wish to load a new magnetic tape cartridge 5 into the mass storage unit 10 or unload the magnetic tape cartridge 5 from the mass storage unit 10. In this case, the operator transmits a command from the host unit and sets the operation mode of the mass storage unit 10 to a load/eject mode. In addition, the operator manipulates a shelf selection switch 11 to rotate the cell drum 1. The host unit forms a mass storage system together with the mass storage unit 10.

The operator monitors a display panel (not shown) or the like, and manipulates the shelf selection switch 11 to stop the rotation of the cell drum 1 when the operator recognizes that a desired cell column 15 has come to the position confronting the door 9.

Then, the operator manipulates a door open switch 12 to open the door 9. Hence, the operator can store the new magnetic tape cartridge 5 into the cell 6 in the desired cell column 15 or retrieve the magnetic tape cartridge 5 from the cell 6 in the desired cell column 15. In this state, the mass storage unit 10 invalidates the signal from the shelf selection switch 11 which is manipulated in response to the signal which is received from the door open switch 12 when this door open switch 12 is manipulated.

When the storage or retrieval of the magnetic tape cartridge 5 with respect to the desired cell column 15 is completed, the operator closes the door 9. The closed state of the door 9 is detected by a sensor 14, and the sensor 14 outputs a signal indicative of the closed state of the door 9. Hence, the mass storage unit 10 validates the signal from the shelf selection switch 11 in response to the output signal of the sensor 14. The operator can then rotate the cell drum 1 so that a next desired cell column 15 moves to the position confronting the door 9, and it is possible to sucessively store or retrieve the magnetic tape cartridge 15 with respect to this next desired cell column 15.

After the storage or retrieval of the magnetic tape cartridge 5 ends, the operator manipulates an end switch 13 to notify the end of the load/eject mode to the mass storage unit 10. The mass storage unit 10 notifies the end of the load/eject mode to the host unit, and the host unit updates the management information.

Next, a description will be given of an example of the management information (cell address information), by referring to FIG. 3.

FIG. 3 shows a case where the cell drum 1 of the mass storage unit 10 has 9 cell columns 15 and 35 shelves are stacked in each cell column 15. Hence, there are 315 cells 6 in this case. The cell 6 in which the magnetic tape cartridge 5 is stored and the cell 6 in which no magnetic tape cartridge 5 is stored can be distinguished by the column numbers "0" through "8" and the shelf number "0" through "34".

At the time of the initial setting, the host unit investigates the column number and the shelf number of the cell 6 in which the magnetic tape cartridge 5 is stored by the operator, and forms management (address) information indicative of the respective cells 6 which store the magnetic tape cartridges 5.

In other words, when the mass storage unit 10 notifies the end of the load/eject mode, the host unit instructs the mass storage unit 10 to rotate the cell drum 1 and to stop the cell drum 1 at a position such that the cell column 15 having the column number "0" confronts the accessor 2. Thereafter, the host unit instructs the mass storage unit 10 to position the mechanical hand 3 to the cell 6 having the shelf number "0", and instructs the fingers 4 to enter within the cell 6 and hold (i.e., engage, or grasp) the magnetic tape cartridge 5 which is stored in this cell 6.

If the fingers 4 can hold the magnetic tape cartridge 5 within the cell 6, the mass storage unit 10 judges that the magnetic tape cartridge 5 exists within this cell 6. In this case, a bar code reader (not shown) which is provided on one of the finger, 4 reads a bar code on the magnetic tape cartridge 5 and transfers the read bar code to the host unit. As indicated by hatchings in FIG. 3, the host unit stores this bar code at the cell position having the column number "0" and the shelf number "0".

The host unit controls the mass storage unit 10 so as to repeat the above described operations, and thus to search for the magnetic tape cartridges 5 stored in the cells 6 having the column number "0" and the shelf numbers "1" through "34". The host unit next instructs the mass storage unit 10 to rotate the cell drum 1 when the writing of the bar code to the respective cell position, where the fingers 4 of the mechanical hand 3 were able to hold the magnetic tape cartridge 5, for each cell of column "0" is completed. In addition, the host unit controls the mass storage unit 10 to similarly search for the magnetic tape cartridges 5 stored in the succession of respective cells 6 having the column number "1" and the shelf numbers "0" through "34" and writes the bar code to the respective cell position, for each cell where the fingers 4 are able to hold the magnetic tape cartridge 5.

This operation of searching for the magnetic tape cartridges 5 stored in the cells 6 having the column numbers "2" through "8" and the shelf numbers "0" through "34" is repeated. The host unit can perform the data write/read operations with respect to the mass storage unit 10 only after the above described searching operation ends.

In other words, the desired magnetic tape cartridge 5 with respect to which the data write/read is to be made is selected from the bar code based on the management information shown in FIG. 3, and the cell address of the cell 6 which stores this desired magnetic tape cartridge 5 is read out by the column number and the shelf number. The host unit instructs the mass storage unit 10 to rotate the cell drum 1 so that the cell column 15, including the cell 6 which stores the desired magnetic tape cartridge 5, confronts the accessor 2. In addition, the mass storage unit 10 is instructed to position the mechanical hand 3 to the position of the cell 6 which has the read out column number and shelf number, and to hold the desired magnetic tape cartridge 5 by the fingers 4. The mechanical hand 3 transports the desired magnetic tape cartridge 5 to the drive unit 7 or 8.

In this state, the host unit updates the management information, and erases the bar code of the cell position from which the desired magnetic tape cartridge 5 was retrieved. In addition, the host unit transports the magnetic tape cartridge 5, which is extracted from the drive unit 7 or 8, to a desired cell position to store the magnetic tape cartridge 5 in the cell 6 at this desired cell position. The host unit also writes the bar code which is read from the magnetic tape cartridge 5 which is transported to the desired cell position, so as to update the management information.

As described above, during the normal write/read operation, the host unit simply needs to update the management information every time one magnetic tape cartridge 5 is moved. For this reason, the processing time required for the updating of the management information is relatively short and the processing efficiency of the computer system is not deteriorated thereby.

However, there is no intervention by the host unit when the operator stores or retrieves the magnetic tape cartridge 5 via the open door 9. Hence, it is impossible in this case to recognize the cells 6 which change, from the state where the magnetic tape cartridge 5 is stored to the state where no magnetic tape cartridge 5 is stored or vice versa. For this reason, the host unit must carry out a process similar to that at the time of the initial setting in order to update the management information. In other words, when the end of the load/eject mode is notified from the mass storage unit 10, the host unit instructs the mass storage unit 10 to search whether or not the magnetic tape cartridge 5 is stored in the cell 6 for all of the 315 cells 6 in the cell drum 1.

The time required to search whether or not the magnetic tape cartridge 5 is stored in one cell 6 is on the order of several seconds because this time includes the time required for the accessor 2 to carry out the mechanical operations. Therefore, it takes 30 minutes or more to make the search operation with respect to all of the 315 cells 6. This time of 30 minutes or more is necessary to make the search operation, regardless of whether or not only one magnetic tape cartridge 5 is to be stored or retrieved with respect to the cell drum 1. As a result, there is a problem in that the processing efficiency of the computer system which uses the mass storage unit 10 is greatly deteriorated when the search operation is involved.

SUMMARY OF THE INVENTION

Accordingly, it is a general object of the present invention to provide a novel and useful management information updating method and a mass storage system, in which the above described problem is eliminated.

Another and more specific object of the present invention is to provide a management information updating method for updating management information which is necessary to manage storage mediums in a mass storage system which includes a rotatable cell drum which is provided with a plurality of cells in a plurality of cell columns and shelves, and an opening which confronts at least one cell column of the cell drum for enabling manual storage or retrieval of the storage medium with respect to the cells in the one cell column in a load/eject mode of the mass storage system, comprising the steps of (a) determining whether or not storage or retrieval of the storage medium has been made in the load/eject mode via the opening with respect to at least one cell in an arbitrary cell column which confronts the opening, (b) storing the management information related to the arbitrary cell column which confronts the opening in the load/eject mode if the storage or retrieval of the storage medium is detected in the step (a), (c) investigaging the management information related to the storage medium stored in each of the cells in the arbitrary cell column, and (d) updating the management information which is related to only the arbitrary cell column and is stored in the step (b) by the management information obtained in the step (c). According to the management information updating method of the present invention, the management information corresponding to the cells with respect to which the storage and/or retrieval of the storage medium was not made manually by the operator in the load/eject mode is not updated. For this reason, if the storage and/or retrieval of the storage medium is only made in the load/eject mode with respect to one cell column of the cell drum which has 9 cell columns, for example, it is possible to reduce the time required to update the management information to 1/9 the time required by the conventional system. Accordingly, it is possible to effectively prevent the processing efficiency of the computer system from becoming deteriorated by the management information updating process which is carried out for the load/eject mode.

Still another object of the present invention is to provide a mass storage system comprising a rotatable cell drum which includes a plurality of cells for storing storage mediums, the cells being arranged in a plurality of cell columns and shelves, recording/reproducing means for making a data read/write operation with respect to the storage medium, accessor means for automatically transporting the storage medium between the cell of the cell drum and the recording/reproducing means in response to an instruction, a housing which accommodates the cell drum, the recording/reproducing means and the accessor means, the housing including an opening which confronts at least one cell column of the cell drum for enabling manual storage or retrieval of the storage medium with respect to the cells in the one cell column in a load/eject mode, first means for determining whether or not storage or retrieval of the storage medium has been made in the load/eject mode via the opening with respect to at least one cell in an arbitrary cell column which confronts the opening, second means, coupled to the first means, for storing management information related to the arbitrary cell column which confronts the opening in the load/eject mode if the storage or retrieval of the storage medium is detected in the first means, third means, coupled to the accessor means, for investigating the management information related to the storage medium in each of the cells in the arbitrary cell column by controlling the accessor means, and fourth means, coupled to the second and third means, for updating the management information which is related to only the arbitrary cell column and is stored in the second means by the management information obtained in the third means. According to the mass storage system of the present invention, the management information corresponding to the cells with respect to which the storage and/or retrieval of the storage medium was not made manually by the operator in the load/eject mode is not updated. Accordingly, it is possible to effectively prevent the processing efficiency f the computer system from becoming deteriorated by the management information updating process which is carried out for the load/eject mode.

Other objects and further features of the present invention will be apparent from the following detailed description when read in conjunction with the accompanying drawings.

BRIEF DESCRIPTION OF THE DRAWINGS

FIGS. 5A, 5B and 5C are plan, side elevational and front elevational views of the internal construction of a mass storage unit in accordance with an embodiment;

DESCRIPTION OF THE PREFERRED EMBODIMENTS

Figure 4B:
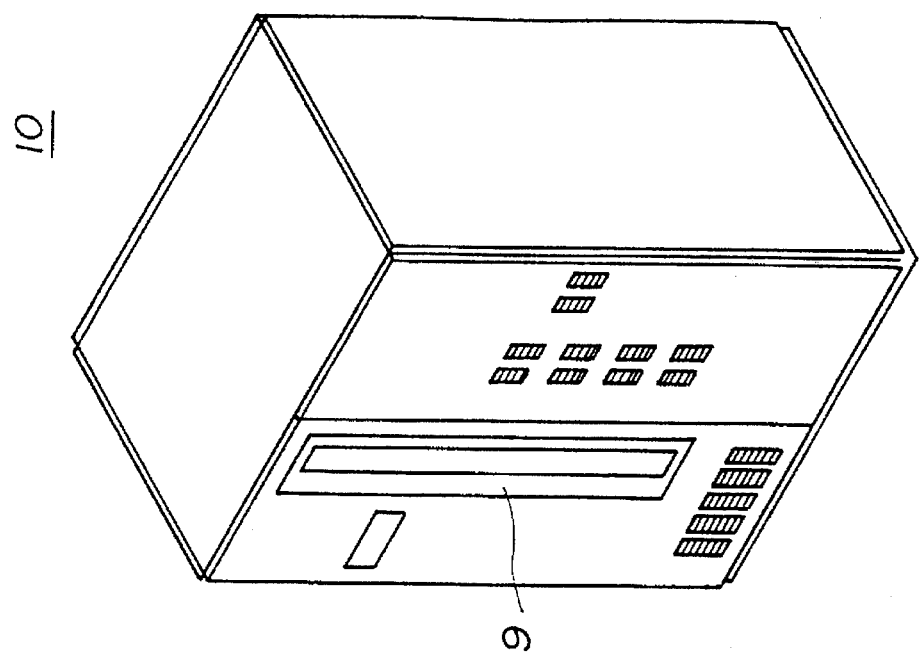
FIGS. 4A and 4B respectively are front and rear perspective views showing an essential part of an embodiment of a mass storage system according to the present invention.
Figure 4A:
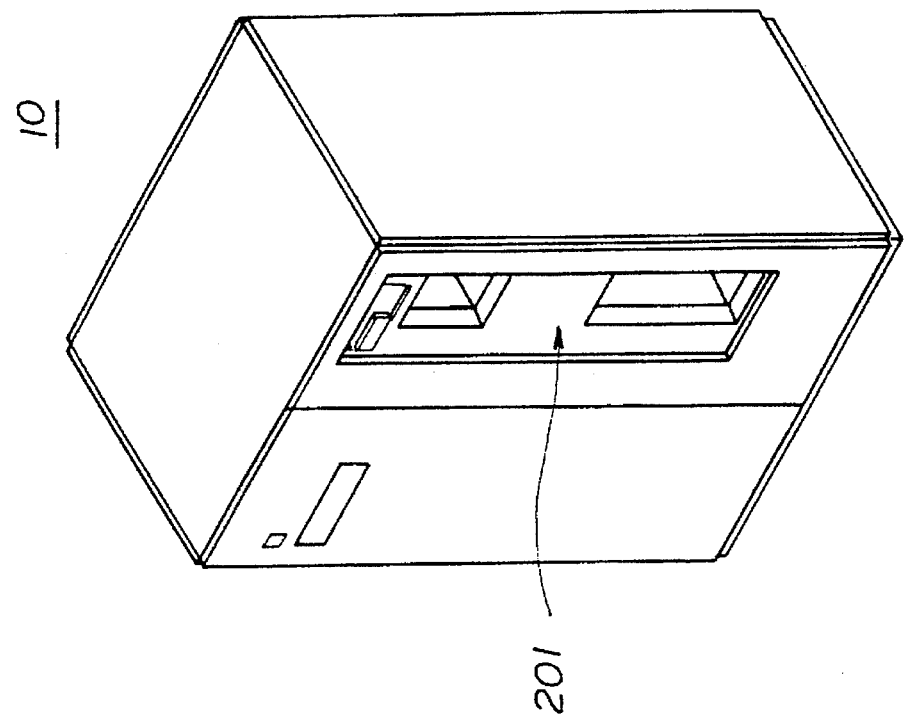
Figure 6:
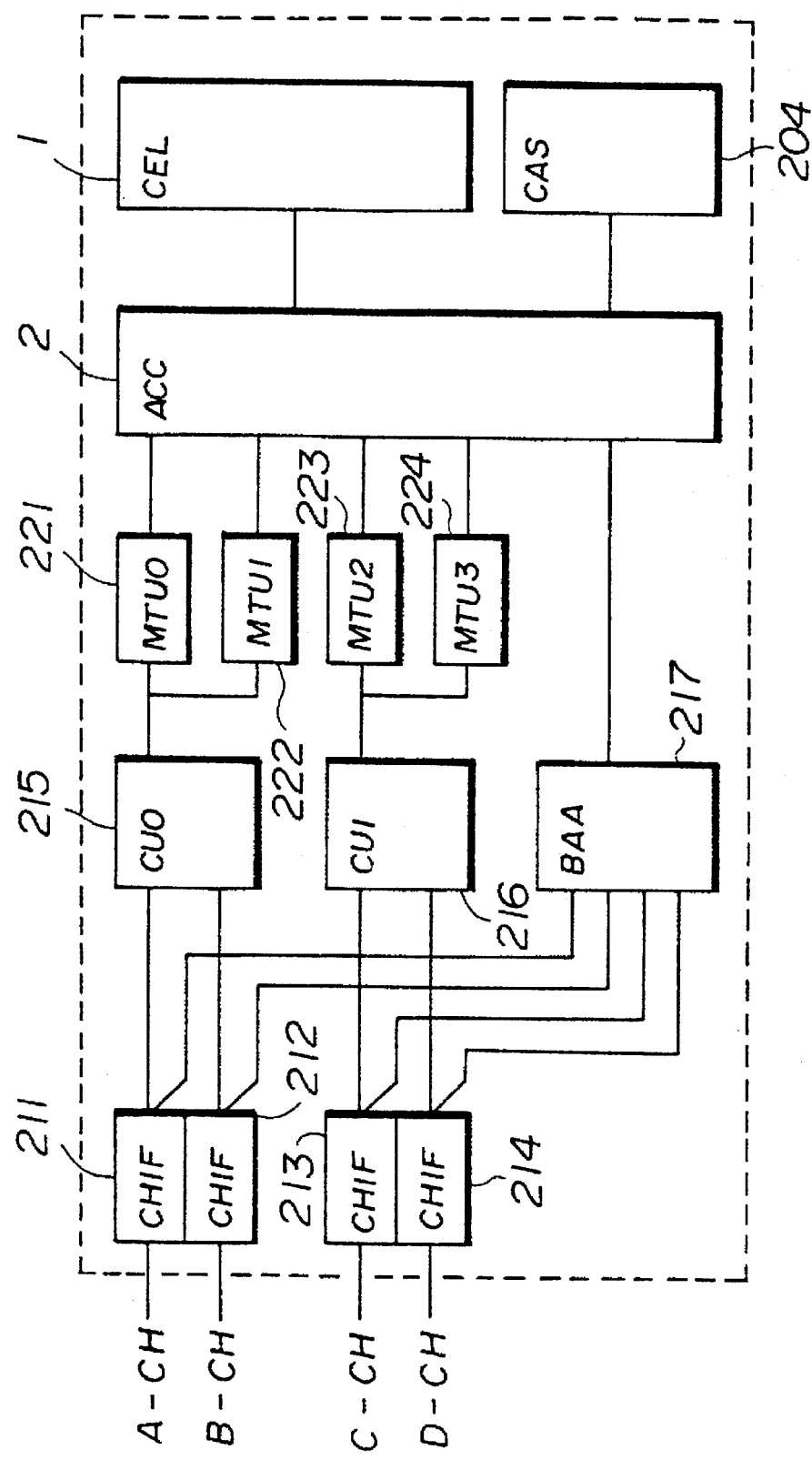
FIG. 6 is a system block diagram showing an of the invention essential part of the embodiment of FIG. 5.

FIGS. 4A and 4B respectively are front and rear perspective views of an embodiment of a mass storage system according to the present invention. FIG. 5A shows a top view of the embodiment with a top panel removed, FIG. 5A shows a side view of the embodiment with a side panel removed, and FIG. 5C shows a front view of the embodiment with a front panel removed. In addition, FIG. 6 is a system block diagram of an essential part of this embodiment. In FIGS. 4A to 6, those parts which are the same as those corresponding parts in FIGS. 1A to 2B are designated by the same reference numerals, and a description thereof will be omitted.

As shown in FIGS. 4A and 4B, respectively, a window 201 is provided in the front panel of the mass storage unit 10, and a door 9 is provided in the rear panel of the mass storage unit 10. In this embodiment, one magnetic tape cartridge 5 is loaded or ejected at a time via the window 201. On the other hand, a plurality of magnetic tape cartridges 5 (for example, 10) are loaded or ejected at a time via the open door 9.

As shown in FIGS. 5A to 6, the mass storage unit 10 generally includes channel interfaces (CHIF) 211 through 214, control units (CU0, CU1) 215 and 216, an accessor adapter (BAA) 217, magnetic tape units (MTU0–MTU3) 221 through 224, an accessor (ACC) 2, a cell drum (CEL) 1, and a cartridge access station (CAS) 204 which are connected as shown. The cartridge access station 204 includes a cartridge loading part 202 and a cartridge ejecting part 203. The operator loads the magnetic tape cartridge 5 into the cell drum 1 via the cartridge loading part 202, and the magnetic tape cartridge 5 which is no longer necessary is ejected from the cell drum 1 to the cartridge ejecting part 203.

The channel interfaces 211 through 214 are respectively coupled to a processor (not shown) via channels A-CH through D-CH, and this processor is coupled to a host unit (not shown), as will be described later in conjunction with FIG. 7.

FIGS. 5 and 6 show a case where four magnetic tape units 221 through 224 are provided. However, the number of magnetic tape units is of course not limited to four.

Figure 7:
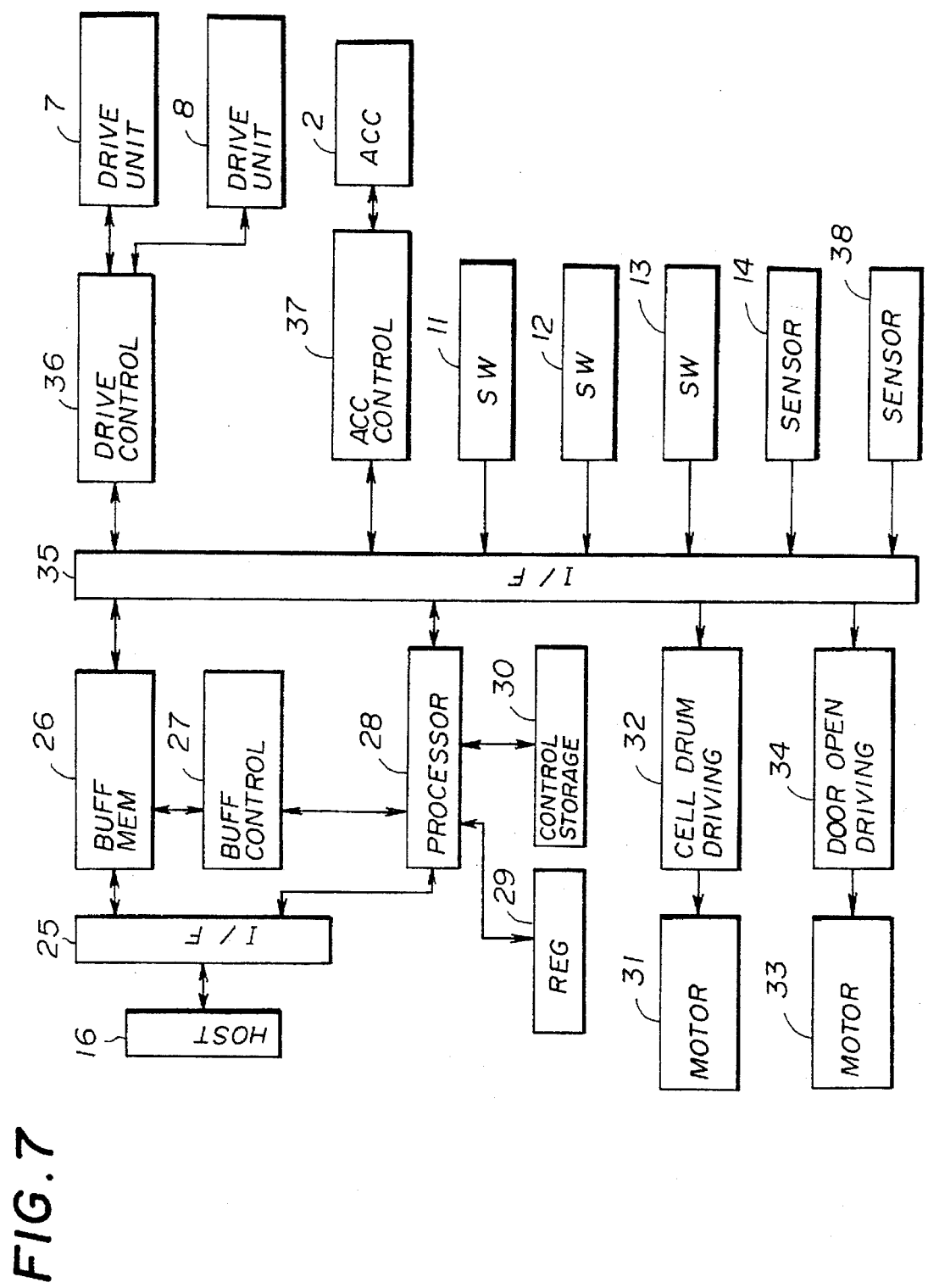
FIG. 7 is a system block diagram showing the embodiment of FIG. 5 in more detail.

FIG. 7 shows this embodiment in more detail. In FIG. 7, those parts which are the same as those corresponding parts in FIGS. 1 and 2 are designated by the same reference numerals, and a description thereof will be omitted.

When the power source (not shown) is turned ON, a processor 28 reads programs stored in a control storage 30 and executes an initial diagnosis program. In other words, the processor 28 starts a cell drum driving circuit 32 via an interface circuit 35 so as to drive a motor 31 to investigate whether or not the cell drum 1 rotates, and starts an accessor control circuit 37 to investigate whether or not the accessor 2 operates. The motor 31 corresponds to the motor M2 shown in FIG. 1, for example. The accessor control circuit 37 corresponds to the accessor adapter 217 shown in FIG. 6. In addition, the accessor control circuit 37 drives the motor M1 shown in FIG. 1 to operate the accessor 2, for example. The interface circuit 35 corresponds to the channel interfaces 211 through 214 shown in FIG. 6.

If the result of the initial diagnosis is satisfactory, the processor 28 waits for an instruction in an idle state. The instruction is received from a host unit 15 via an interface circuit 25. This host unit 15 forms the mass storage system together with the mass storage unit 10.

When the load/eject mode is instructed from the host unit 16 via the interface circuit 25, the processor 28 starts to operate in the load/eject mode. If a shelf selection switch 11 is pushed in this state, the processor 28 drives the motor 31 via the cell drum driving circuit 32 so as to rotate the cell drum 1.

If the shelf selection switch 11 is released, the processor 28 stops driving the motor 31 via the cell drum driving circuit 32 and stops the rotation of the cell drum 1. Then, the processor 28 monitors the state of a door open switch 12 via the interface circuit 35. If the door open switch 12 is pushed, the processor 28 drives a door open driving circuit 34 via the interface circuit 35, so as to drive a motor 33 and open the door 9 as shown in FIG. 5 (a).

The processor 28 then waits for a sensor 14 to notify the closed state of the door 9 via the interface circuit 35. If the sensor 14 notifies the closed state of the door 9, the processor 28 stores the identification, or number, of a cell column 15 which confronts the door 9, into a register 29.

In other words, the cell drum 1 may have 9 cell columns 15, and, in such a case, the cell columns 15 may be numbered from "0" to "8". Accordingly, the processor 28 recognizes the cell column number of the cell column 15 which confronts the door 9, based on an output of a sensor 38, which is received via the interface circuit 35. This sensor 38 detects the rotation quantity of the cell drum 1 from a reference position. The processor 28 stores the recognized cell column number into the register 29.

On the other hand, the processor 28 monitors the state of an end switch 13 via the interface circuit 35. If the shelf selection switch 11 is pushed again before the end switch 13 is pushed, the processor 28 carries out the above described operation of rotating the cell drum 1. Thereafter, if the shelf selection switch 11 is released, the processor 28 stops rotating the cell drum 1. The operator opens the door 9 by pushing the door open switch 12, so as to store or retrieve the magnetic tape cartridge 5. When the sensor 14 notifies the closed state of the door 9 to the processor 28 via the interface circuit 35, the processor 28 stores the cell column number of the cell column 15 which confronts the door 9 into the register 29.

The operation described above is repeated until the end switch 13 is pushed. When the end switch 13 is pushed, the processor 28 stops the operation in the load/eject mode. In addition, the processor 28 reads out the stored cell column numbers from the register 29 and transmits these cell column numbers to the host unit 16 via the interface circuit 25.

The host unit 16 which receives the cell column numbers transmits an instruction to make the cell column 15 having the received cell column number confront the accessor 2. This instruction is transmitted to the processor 28 via the interface circuit 25. Responsive to this instruction, the processor 28 drives the motor 31 via the cell drum driving circuit 32, and rotates the cell drum 1 to a position such that the cell column 15 having the specified cell column number confronts the accessor 2.

Next, the host unit 16 instructs the processor 28 via the interface circuit 25, so as to drive the accessor 2 via the accessor control circuit 37 and to successively search for the existance of the magnetic tape cartridge 5 within each of the cells 6, having the successive shelf numbers "0" to "34".

The host unit 16 receives the result of the search operation via the processor 28 and the interface circuit 25, and updates the management information corresponding to the cell column numbers of the cells 6 with respect to which the storage or retrival of the magnetic tape cartridge 5 was made.

When the host unit 16 instructs the processor 28 to write data as to the magnetic tape cartridge 5 which is stored at a specified cell column number and shelf number, the processor 28 operates to rotate the cell drum 1 similarly to the above. In other words, the processor 28 rotates the cell drum 1 to a position where the cell column 15 having the specified cell column number confronts the accessor 2. In addition, the processor 28 operates to retrieve the magnetic tape cartridge 5 from the cell 6 having the specified shelf number and sets the retrieved magnetic tape cartridge 5 into a drive unit 7 or 8. The drive units 7 and 8 correspond to the magnetic tape units 221 and 222, for example, and only two drive units are shown in FIG. 7 for the sake of convenience.

When the host unit 16 requests a data transmission, a buffer memory 26 is controlled via a buffer control circuit 27 so as to temporarily store the data which is received via the interface circuit 25 into the buffer memory 26. Then, the data in the buffer memory 26 is transmitted to the drive unit 7 or 8 via the interface circuit 35 and a drive control circuit 36, and the data is written into the magnetic tape cartridge 5 which is set in the drive unit 7 or 8. The drive control circuit 36 corresponds to the control unit 215 shown in FIG. 6.

On the other hand, when the host unit 16 requests a data reception, the data which is read from the magnetic tape cartridge 15 set in the drive unit 7 or 8 is once stored in the buffer memory 26 via the drive control circuit 36 and the interface circuit 35. Thereafter, the data in the buffer memory 26 is transmitted to the host unit 16 via the interface circuit 25.

Therefore, according to this embodiment, the management information corresponding to the cells 6 with respect to which the storage and/or retrieval of the magnetic tape cartridge 15 was not made manually by the operator in the load/eject mode is not updated. For this reason, if the storage and/or retrieval of the magnetic tape cartridge 5 is only made in the load/eject mode with respect to one cell column of the cell drum 1 which has 9 cell columns, it is possible to reduce the time required to update the management information to 1/9th the time required by the conventional system. Accordingly, it is possible to effectively prevent the processing efficiency of the computer system from becoming deteriorated by the management information updating process which is carried out for the load/eject mode.

Next, a description will be given of the operation of the embodiment shown in FIG. 7, by referring to FIG. 8. The flow chart of FIG. 8 shows a cell check process which corresponds to an embodiment of a management information updating method according to the present invention.

Figure 8:
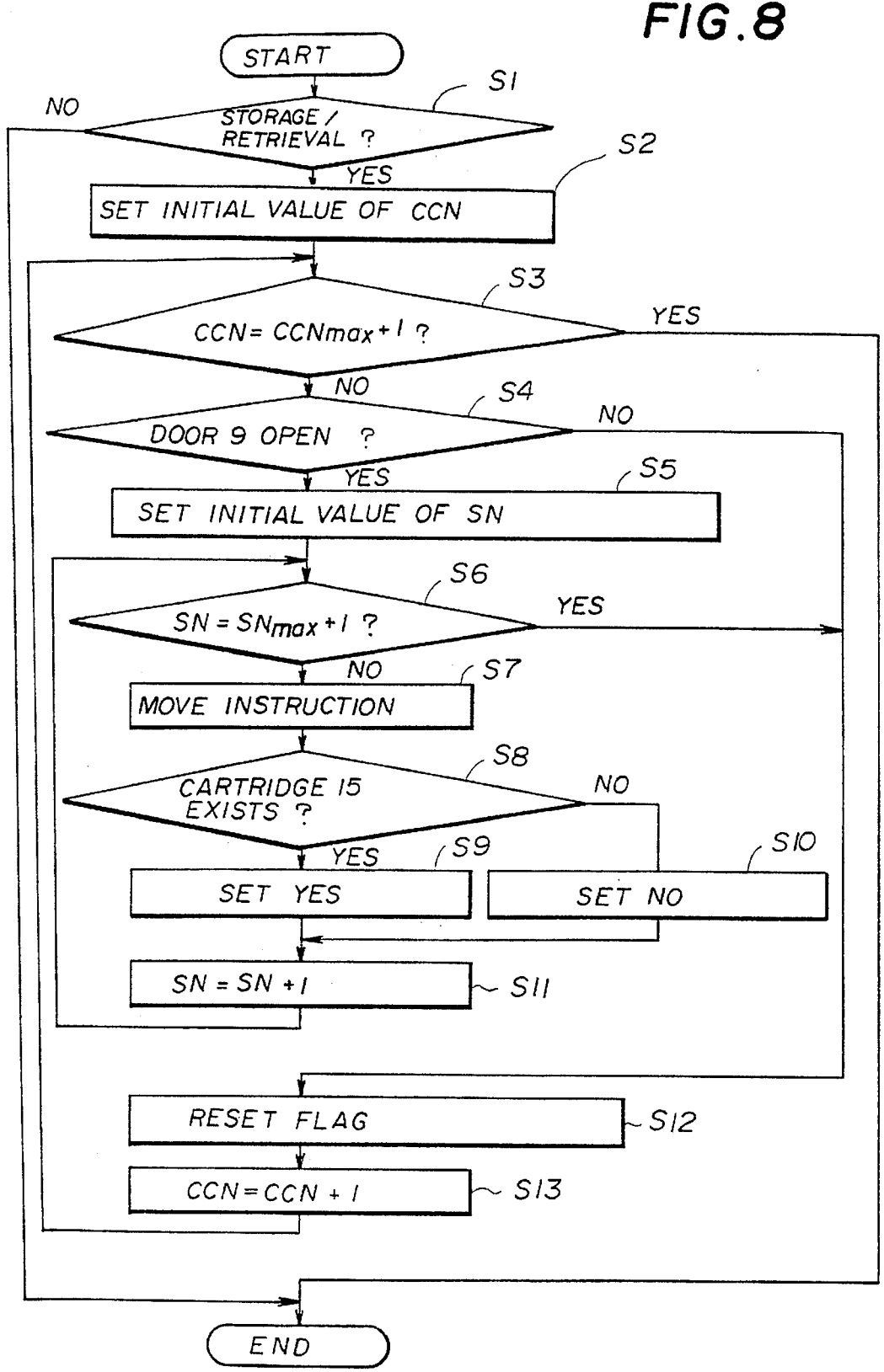
FIG. 8 is a flow chart for explaining the operation of the embodiment shown in FIG. 7.

In FIG. 8, a step S1 decides whether or not a storage/retrieval of a magnetic tape cartridge 5, with respect to the cell drum 1, has been made. The process ends if the decision result in the step S1 is NO. If the decision result in the step S1 is YES, a step S2 sets an initial value of the cell column number CCN, and a step S3 decides whether or not the cell column number CCN is equal to a maximum cell column number $CCN_{max}$ plus one. The maximum cell column number $CCN_{max}$ is the maximum number the cell column number CCN can take, and $CCN_{max}$=9, for example. The process ends if the decision result in the step S3 is YES.

On the other hand, if the decision result in the step S3 is NO, a step S4 decides whether or not the door 9 is open in a state where a predetermined cell column 15 confronts the door 9, and also sets a flag indicative of the opening of the door 9 in this state. The process advances to a step S12 which will be described later if the decision result in the step S4 is NO.

If the decision result in the step S4 is YES, a step S5 sets an initial value of the shelf number (or row number) SN, and a step S6 decides whether or not the cell shelf, or row, number SN is equal to a maximum shelf number $SN_{max}$ plus one. The maximum shelf number $SN_{max}$ is the maximum number the shelf number SN can take, and $SN_{max}$=35, for example. The process advances to the step S12 if the decision result in the step S6 is YES.

The step S12 resets the flag described above, and a step S13 increments the cell column number CCN by one. The process returns to the step S3 after the step S13.

On the other hand, if the decision result in the step S6 is NO, a step S7 issues a move instruction by specifying the source cell address and the destination cell address. Then, a step S8 decides whether or not the magnetic tape cartridge 5 exists in the cell 6 at the specified cell address. A step S9 sets a management information indicating the existance of the magnetic tape cartridge 5 if the decision result in the step S8 is YES. A step S10 sets a management information indicating the non-existance of the magnetic tape cartridge 5 if the decision result in the step S8 is NO. A step S11 increments the shelf number SN by one after the step S9 or S10, and the process returns to the step S6 after the step S11.

In the embodiments described heretofore, only one cell column confronts the door 9 at a single rotational position of the cell drum 1. However, it is of course possible to arrange the cells 6 of the cell drum 1 so that two or more cell columns confront the door 9 at a single rotational position of the cell drum 1.

Further, the present invention is not limited to these embodiments, but various variations and modifications may be made without departing from the scope of the present invention.

What is claimed is:

1. A management information updating method for updating management information relating to the management of plural storage media in a mass storage system and including the location of the storage media in the mass storage system, said mass storage system including a rotatable cell drum having an axis and a plurality of cells arranged in a plurality of cell columns of a desired number disposed circumferentially about, and parallel to, the axis and in a plurality of shelves disposed transversely to, and spaced along, the axis, each cell location being defined in a respective cell column and on a respective shelf, a manual access station having an opening which confronts N cell columns of the cell drum, where 1≦N< the desired number of cell columns, for enabling manual insertion or retrieval of the storage media with respect to the cells in one of the N cell columns confronting the opening in a load/eject mode of the mass storage system, and an automated access station displaced from the manual access station wherein in an initial setting step, initial management information as to the respective column and shelf locations of all storage media stored in the mass storage system is investigated for storage, said management information updating method comprising the steps of:

(a) determining whether or not insertion or retrieval of a storage medium has been made manually in the load/eject mode of the system at the manual access station via the opening, with respect to a respective cell in an arbitrary cell column which currently confronts the opening;

(b) storing the management information identifying the arbitrary cell column, when positioned to confront the opening at the manual access station and in the load/eject mode, if the storage or retrieval of a storage medium is determined in said step (a);

(c) with the arbitrary cell column confronting the automated access station, investigating the respective management information for each storage medium stored in a corresponding cell in the arbitrary cell column; and (d) updating the stored, initial management information only for the arbitrary cell column identified in said step (b), by the management information obtained in said step (c).

2. The management information updating method as claimed in claim 1, wherein the manual access station of the mass storage system further comprises a door which normally covers the opening, the method further comprising, in said step (a), detecting whether the door is open or closed.

3. The management information updating method as claimed in claim 2, wherein said step (b) further comprises storing the management information identifying the arbitrary cell column when the closed state of the door is detected, following the detection of the open state of the door, by said step (a).

4. The management information updating method as claimed in claim 1, further comprising repeating said steps (b) and (c) until an end of the load/eject mode instruction occurs.

5. The management information updating method as claimed in claim 4, wherein said step (d) further comprises updating the stored, initial management information in response to an end of the load/eject mode instruction.

6. The management information updating method as claimed in claim 1, which further comprises the step of:

(e) rotating the cell drum, in response to a start of load/eject mode instruction defining the arbitrary cell column, to position the arbitrary cell column such that it confronts the opening at the manual access station.

7. A mass storage system comprising:

a rotatable cell drum having an axis and a plurality of cells for storing a corresponding plurality of storage media, said plurality of cells being arranged in a plurality of cell columns of a desired number, disposed circumferentially about, and parallel to, the axis and a plurality of shelves disposed transversely to, and spaced along, the axis, each cell location being defined in a respective cell column and on a respective shelf;

recording/reproducing means for performing a data read/write operation with respect to a selected storage medium of the plurality of storage media;

accessory means, disposed at an automated access station, for automatically transporting a selected storage medium between a corresponding cell, of a cell column disposed at the automatic access station, of said cell drum and said recording/reproducing means in response to an instruction;

a housing which accommodates said cell drum, said recording/reproducing means and said accessory means, said housing including a manual access station having an opening which confronts N cell columns of said cell drum, where 1≦N< the desired number of cell columns, and which enables manual insertion of a storage medium into, or retrieval of a storage medium from, respectively associated cells of an individual cell column in a load/eject mode of operation of the system;

first means for determining whether or not manual storage or retrieval of the storage medium has occurred at the manual access station in the load/eject mode of the system, via the opening, with respect to at least one cell in an arbitrary cell column which currently confronts the opening;

second means, operative in an initial setting step, for determining and storing management information as to the location of all storage media inserted in the mass storage system, the location including the respective cell column and the respective cell location in the respective cell column of each storage medium, the second means further being coupled to said first means for storing management information related to the arbitrary cell column, which currently confronts the opening at the manual access station and in the load/eject model, if the storage or retrieval of the storage medium is detected by said first means;

third means, coupled to said accessory means, for investigating the management information related to the storage medium in each of the cells in the arbitrary cell column, which currently is positioned at the automated access station, by controlling said accessory means; and fourth means, coupled to said second and third means, for updating the initial management information, related only to the arbitrary cell column and stored in said second means, by the management information obtained by said third means.

8. The mass storage system as claimed in claim 7, said housing further comprising, at the manual access station, a door which normally covers the opening in said housing and said first means further comprising means for detecting whether the door is open or closed.

9. The mass storage system as claimed in claim 8, wherein said second means is responsive to the closed state of the door being detected by said first means, following the detection thereby of the open state of the door, for storing the management information.

10. The mass storage system as claimed in claim 7, wherein said second and third means repeat the operations thereof until receipt thereby of an end of the load/eject mode instruction.

11. The mass storage system as claimed in claim 10, wherein said fourth means updates the management information in response to receiving an end of the load/eject mode instruction.

12. The mass storage system as claimed in claim 7, further comprising fifth means, responsive to an instruction, for rotating said cell drum to a rotational position defined by the manual access station and at which the arbitrary cell column confronts the opening.

13. The mass storage system as claimed in claim 7, wherein said third mans further comprises means for detecting the existence of a storage medium in a cell, in succession for each of the plural cells of a cell column and in succession for each of the plural cell columns, when designated as an arbitrary cell column and when rotated to the automated access station.

14. A method for updating management information relating to the identity of plural storage media cartridges and respective addresses of cartridge-storing cells of a rotatable cell drum of a mass storage system in which the cartridges are inserted and stored, the rotatable cell drum having plural cell columns and each column comprising plural cells, the mass storage system further comprising a manual access station at which, in an operator-initiated load/eject mode of operation of the system, a column of the cell drum selected by the operator is positioned by rotation of the drum for manual insertion or retrieval of a cartridge into or from a cell of the selected cell column and an automated access station at which the cell columns are selectively and sequentially, automatically positioned by rotation of the drum for automated loading or ejecting of a cartridge into or from the system and for automated investigation and processing of management information relating to the cells, and respective cartridges inserted therein, of the cell column positioned at the automated access station, the method comprising the steps of:

(a) in an initial management information setting step, rotating the cell drum so as to position each column, in a prescribed column sequence, at the automated access station and, for each column and in accordance with a prescribed cell sequence, investigating each of the plural cells of the cell column currently positioned at the automated access station for detecting the presence of a cartridge and determining the identity of each such detected cartridge and storing, as initial management information, the detected cartridge identity in relation to the corresponding cell address, for each of the plural cells and for each of the plural columns in accordance with the respective, prescribed cell and column sequences;

(b) in the operator-initiated load/eject mode of operation of the system and in response thereto, identifying each operator-selected cell column positioned at the manual access station and accessible to the operator for manual insertion or retrieval of a cartridge into or from a cell thereof;

(c) at the conclusion of the operator-initiated load/eject mode of operation and responsive thereto, automatically rotating the cell drum to position each operator-selected and identified cell column at the automated access station; and (d) repeating the initial management information setting step (a) and thereby updating the initial management information exclusively for each operator-selected cell column, identified in the load/eject mode of operation.

15. A method as recited in claim 14 further comprising, at the automated access station:

for each cartridge being newly loaded, performing an automated identification of the cartridge and inserting the identified cartridge being loaded into a specified, respective address-identified cell;

for each previously loaded cartridge being ejected, retrieving the identified cartridge from the respective address-identified cell and ejecting same from the system; and updating the initial management information respectively for each newly loaded cartridge and for each ejected cartridge.

16. The method recited in claim 16, further comprising, in response to a read/write instruction and at the automated access station, retrieving an identified cartridge from the respective, address-identified cell, performing the instructed, automated read and write operations on the storage media thereof and, upon conclusion of the read/write operations, reinserting the cartridge into the respective, address-identified cell.

17. A system for updating management information relating to the identity of plural storage media cartridges and respective addresses of cartridge-storing cells of a rotatable cell drum of a mass storage system in which the cartridges are inserted and stored, the rotatable cell drum having plural cell columns and each column comprising plural cells, each cell having an address and accommodating a cartridge therein, the mass storage system further comprising a manual access station at which, in an operator-initiated load/eject mode of operation of the system, a column of the cell drum selected by the operator is positioned by rotation of the drum for manual insertion or retrieval of a cartridge into or from a cell of the operator-selected cell column and an automated access station at which the cell columns are selectively and sequentially, automatically positioned by rotation of the drum for automated loading or ejecting of a cartridge into or from the system, the system comprising:

means for selectively positioning each column at the automated access station;

means for investigating, in accordance with a prescribed cell sequence, each of the plural cells of a cell column currently positioned at the automated access station thereby to detect the presence of a cartridge therein and to determine the identity of each such detected cartridge;

means for controlling the selective positioning means for advancing each cell column, in a prescribed cell column sequence, to the automated access station to enable the investigating means to investigate each of the plural cells of the prescribed cell sequence and for storing, as initial management information, the detected cartridge identity and corresponding cell address, for each of the plural cells and for each of the plural columns in accordance with the respective, prescribed cell and column sequences;

means, operative in the operator-initiated load/eject mode of operation of the system and in response thereto, for identifying each operator-selected cell column positioned at the manual access station and thereby accessible to an operator for manual insertion or retrieval of a cartridge into or from a cell; and means, operative at the conclusion of the operator-initiated load/eject mode of operation and responsive thereto, for automatically and selectively positioning each operator-selected and identified cell column at the automated access station and for causing the investigating means to investigate each of the plural cells, in accordance with the prescribed cell sequence, of the cell column currently positioned at the automated access station, to detect the presence of a cartridge therein and to determine the identity of each such detected cartridge and for updating the initial management information in accordance with any change in the detected cartridge identity and corresponding cell address, exclusively for each operator-selected and identified cell column and as to which a change in the initial management information has occurred.

18. A method as recited in claim 17 further comprising, at the automated access station:

means for performing an automated identification of each cartridge being newly loaded and for inserting the identified cartridge being loaded into a specified, address-identified cell;

means for ejecting a previously loaded cartridge by retrieving the identified cartridge from the respective address-identified cell and ejecting the retrieved cartridge from the system; and said updating means, further, updating the management information respectively for each newly loaded cartridge and for each ejected cartridge.

19. The method recited in claim 18, further comprising:

means, responsive to a read/write instruction and disposed at the automated access station, for retrieving an identified cartridge from the respective, address-identified cell and performing automated read/write operations on the storage media thereof and, upon conclusion of the read/write operations, for reinserting the cartridge into the respective, address-identified cell.

20. A mass storage system comprising:

a rotatable cell drum having an axis and a plurality of cells for storing a corresponding plurality of storage mediums, said plurality of cells being arranged in a plurality of cell columns and a plurality of shelves in each of the cell columns, each cell having a respective location in the cell drum defined by a respective cell column and a respective shelf;

data access means for performing a data access operation with respect to a storage medium which separately identifies the storage medium;

accessory means for transporting a storage medium between cell location and said data access means;

a housing which accommodates said cell drum, said data access means and said accessory means, said housing including a manual access station having an opening at which a selected cell column is selectively positionable in confronting relationship by rotation of the cell drum and which opening enables manual access of a storage medium in relation to a cell in the confronting cell column;

means for storing management information as to all of the storage mediums and the corresponding cell locations thereof in said cell drum, the management information including the respective cell location, defined by the respective cell column and the respective shelf, for each separately identified storage medium stored in the cell drum;

means for determining whether or not a manual access has occurred at the manual access station via the opening, with respect to a cell column which currently confronts the opening, and for producing a determination output identifying the confronting cell column as to which it is determined that a manual access has occurred; and control means responsive to the determination output for controlling the accessory means to transport each storage medium, stored in a respective cell location of the confronting cell column, between the respective cell location and the data access means and for controlling the data access means to perform a data access operation on the transported storage medium thereby for separately identifying the transported storage medium and, further, for updating the management information in said storing means with the obtained, respective cell location information for each such identified storage medium located in the confronting cell column.

21. A mass storage system comprising:

a rotatable cell drum having an axis and a plurality of cells for storing a corresponding plurality of storage mediums, said plurality of cells being arranged in a plurality of cell columns and a plurality of shelves in each of the cell columns, each cell having a respective cell location defined by a respective cell column and a respective shelf;

data access means for performing a data access operation with respect to a storage medium, including separately identifying each storage medium;

accessory means for transporting a selected storage medium between the cell corresponding thereto and said data access means;

a housing which accommodates said cell drum, said data access means and said accessory means, said housing including a manual access station having an opening which confronts at least one of said cell columns and which enables manual access of a storage medium related to a cell of a confronting cell column;

means for storing management information as to all of the storage mediums stored in corresponding cells in said cell drum, the stored management information including the cell location for each identified storage medium;

means for determining whether or not a manual access has occurred at the manual access station via the opening, with respect to a cell of a corresponding cell column which currently confronts the opening and for producing a respective determination output identifying each such confronting, manually accessed cell column; and means, responsive to each determination output of the determining means, for controlling the data access means, solely for the respective, manually accessed cell column identified by the determination output, to perform a data access operation on, and provide an identification of, each storage medium and the respective cell location thereof, of the respective, manually accessed cell column identified by the determination output and for correspondingly updating the management information stored in said storing means.

22. A mass storage system as recited in claim 21, wherein:

the manual access station further comprises a door having a normally closed position for covering the opening and being selectively movable to an open position to enable manual access by an operator through the opening; and the determining means determines whether or not manual access has occurred by detecting movement of the door from the closed position to the open position.

23. A mass storage system comprising:

a rotatable cell drum having an axis and a plurality of cells for storing a corresponding plurality of storage mediums, said plurality of cells being arranged in a plurality of cell columns and a plurality of shelves in each of the cell columns, each cell having a respective cell location defined by a respective cell column and a respective shelf;

data access means for performing a data access operation with respect to a storage medium, including separately identifying each storage medium;

accessory means for transporting a selected storage medium between the cell corresponding thereto and said data access means;

a housing which accommodates said cell drum, said data access means and said accessory means, said housing including a manual access station having an access opening which confronts at least one of said cell columns and a door which normally covers the access opening and which is selectively moveable to an open position to enable manual access therethrough by an operator selectively to the cells of the confronting cell column, for insertion or retrieval of storage medium into or from respective cells of the confronting cell column;

means for storing management information as to storage mediums stored in the cell drum, including, for each cell column, the identification of each storage medium stored in a corresponding cell location thereof and the respective cell location;

means for determining whether or not the door covering the access opening has been opened to permit manual access at the manual access station by an operator via the opening, with respect to a cell column which currently confronts the opening, and for producing a respective determination output identifying each such confronting, manually accessed cell column; and means, responsive to each determination output of the determining means, for controlling the data access means, solely for the respective, manually accessed cell column identified by the determination output, to perform a data access operation on, and provide an identification of, each storage medium and the respective cell location thereof, of the respective, manually accessed cell column identified by the determination output and for updating the corresponding management information stored in said storing means.

* * * * *

UNITED STATES PATENT AND TRADEMARK OFFICE
CERTIFICATE OF CORRECTION

PATENT NO. : 5,657,180
DATED : Aug. 12, 1997
INVENTOR(S) : KURUSU et al.

It is certified that error appears in the above-identified patent and that said Letters Patent is hereby corrected as shown below:

Col. 1, line 62, delete "In"; and change "conventions" to --conventional--.

Col. 2, line 12, change "cells 6" to --cell 6--;
line 46, change "is a diagram" to --diagrams--.

Col. 3, line 57, change "finger, 4" to --fingers 4--.

Figure 1A:
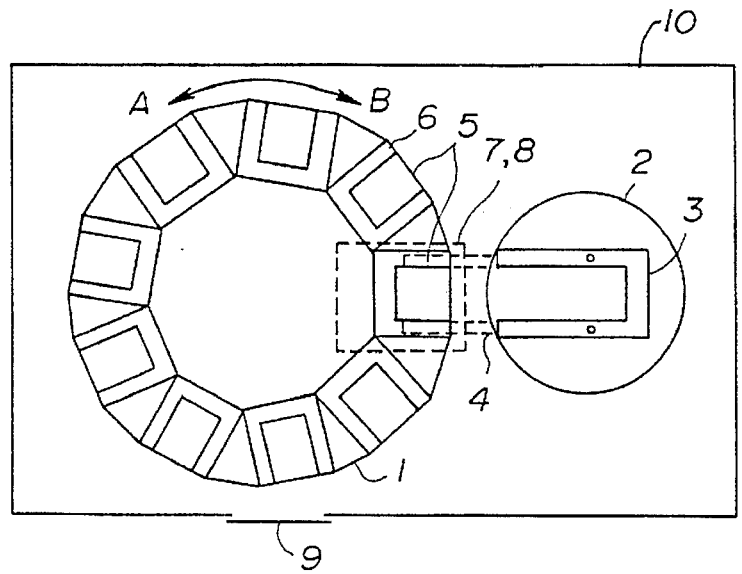
FIGS. 1A and 1B are plan and elevational views of a conventional mass storage system.
Figure 1B:
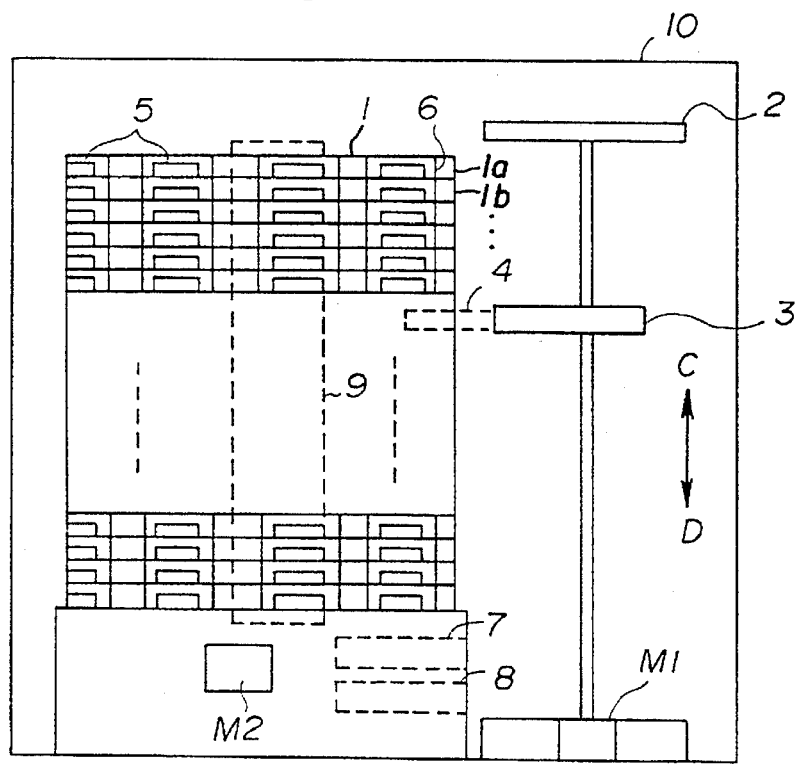
Figure 2A:
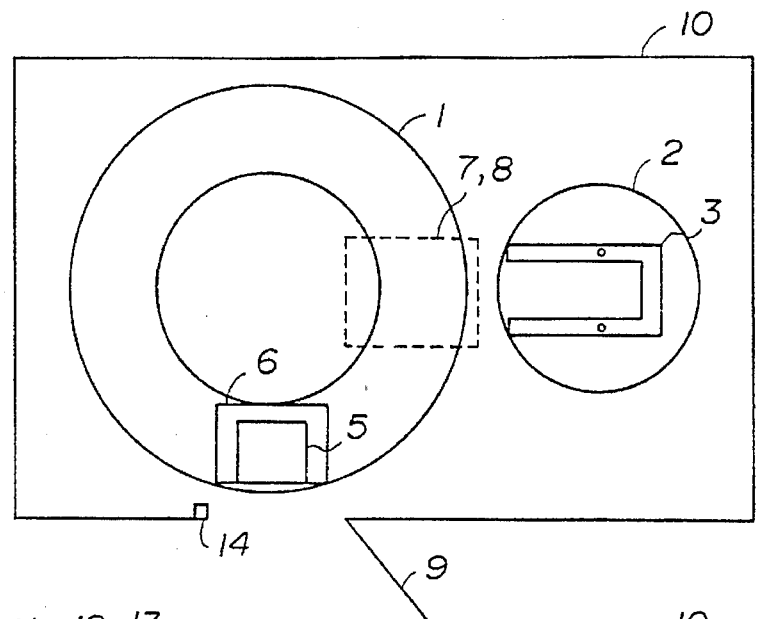
FIGS. 2A and 2B are plan and elevational schematic view of the system of FIG. 1 for explaining the storage and retrieval of magnetic tape cartridges in the conventional mass storage system shown in FIG. 1.
Figure 2B:
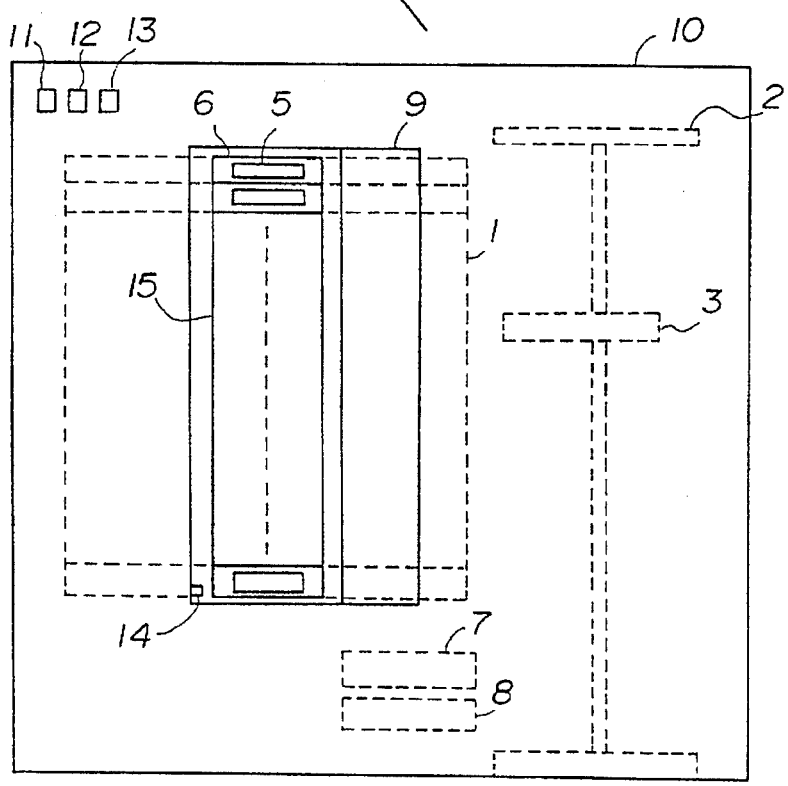
Figure 3:
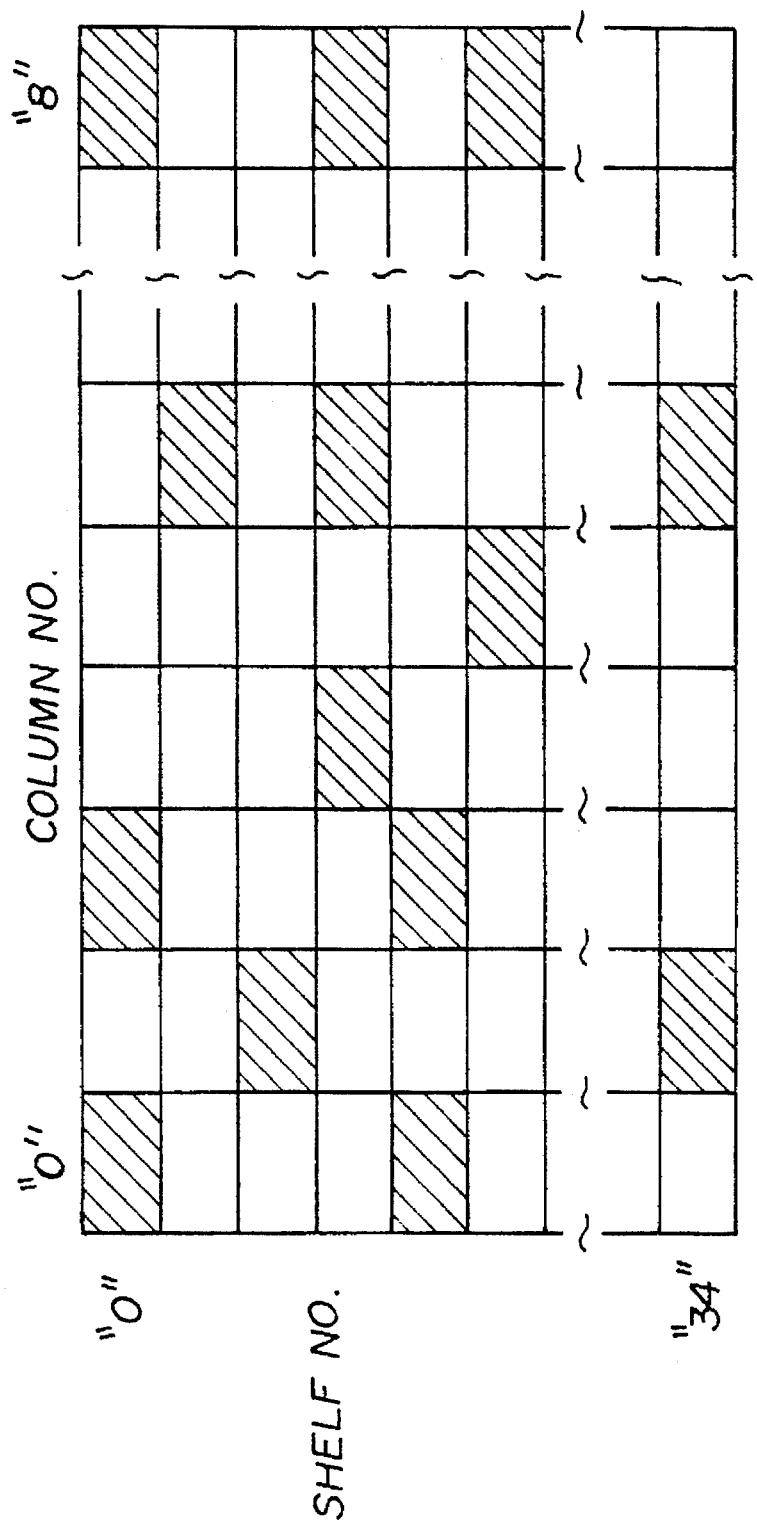
FIG. 3 is a diagram for explaining management information.

Col. 6, line 21, change "efficiency f" to --efficiency of--;
line 32, change "view" to --views--;
line 33, change "FIG. 1" to --FIGS. 1A and 1B--;
line 35, change "FIG. 1" to --FIGS. 1A and 1B--;
line 43, after "embodiment" insert --of the invention--;
line 44, delete "of the";
line 45, delete "invention"; and change "FIG. 5" to --FIG. 5C--;
line 57, change "Fig. 5A" to --FIG. 5B--.

Col. 7, line 25, change "5" to --5C--;
line 30, change "1 and 2" to --1A and 1B and 2A and 2B--;
line 40, change "FIG. 1" to --FIG. 1B--.

Col. 9, line 10, change "15" to --5--; and change "once" to --initially--;
line 18, change "15" to --5--.

Col. 10, line 37 (Claim 1, line 18), after "wherein" insert --,--.

Col. 11, line 64 (Claim 7, line 44), change "model" to --mode--.

UNITED STATES PATENT AND TRADEMARK OFFICE
CERTIFICATE OF CORRECTION

PATENT NO. : 5,657,180
DATED : Aug. 12, 1997
INVENTOR(S) : KURUSU et al.

It is certified that error appears in the above-identified patent and that said Letters Patent is hereby corrected as shown below:

Col. 12, line 34 (Claim 13, line 2), change "mans" to --means--.

Col. 14, line 67 (Claim 20, line 13), after "between" insert --a--.

Signed and Sealed this

Twenty-seventh Day of January, 1998

Attest:

BRUCE LEHMAN

Attesting Officer

Commissioner of Patents and Trademarks